July 21, 1953     W. A. POHLMAN     2,645,877
INSECT TRAP
Filed Dec. 1, 1951     2 Sheets-Sheet 1
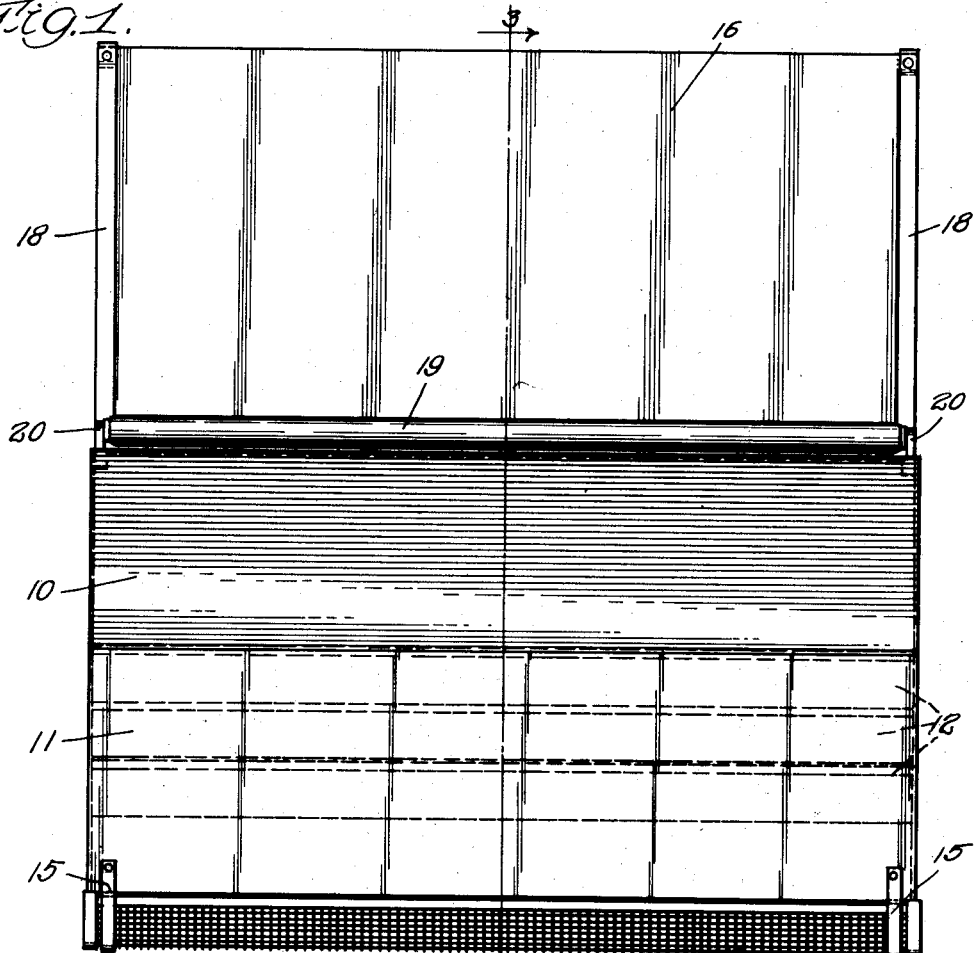
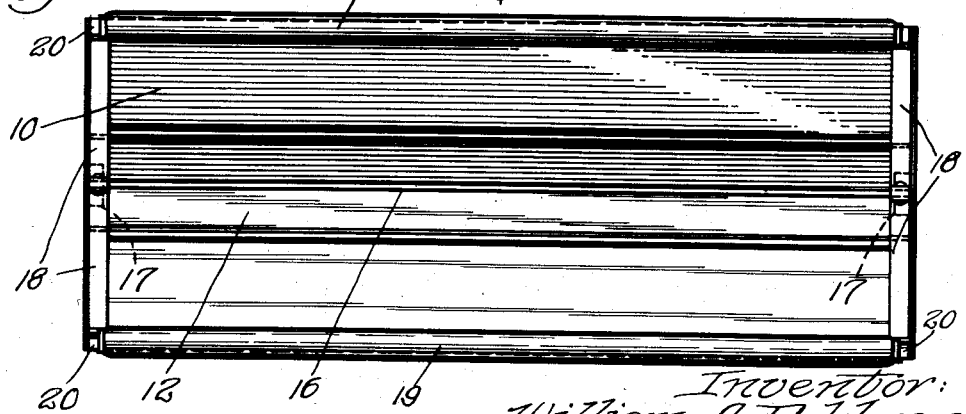

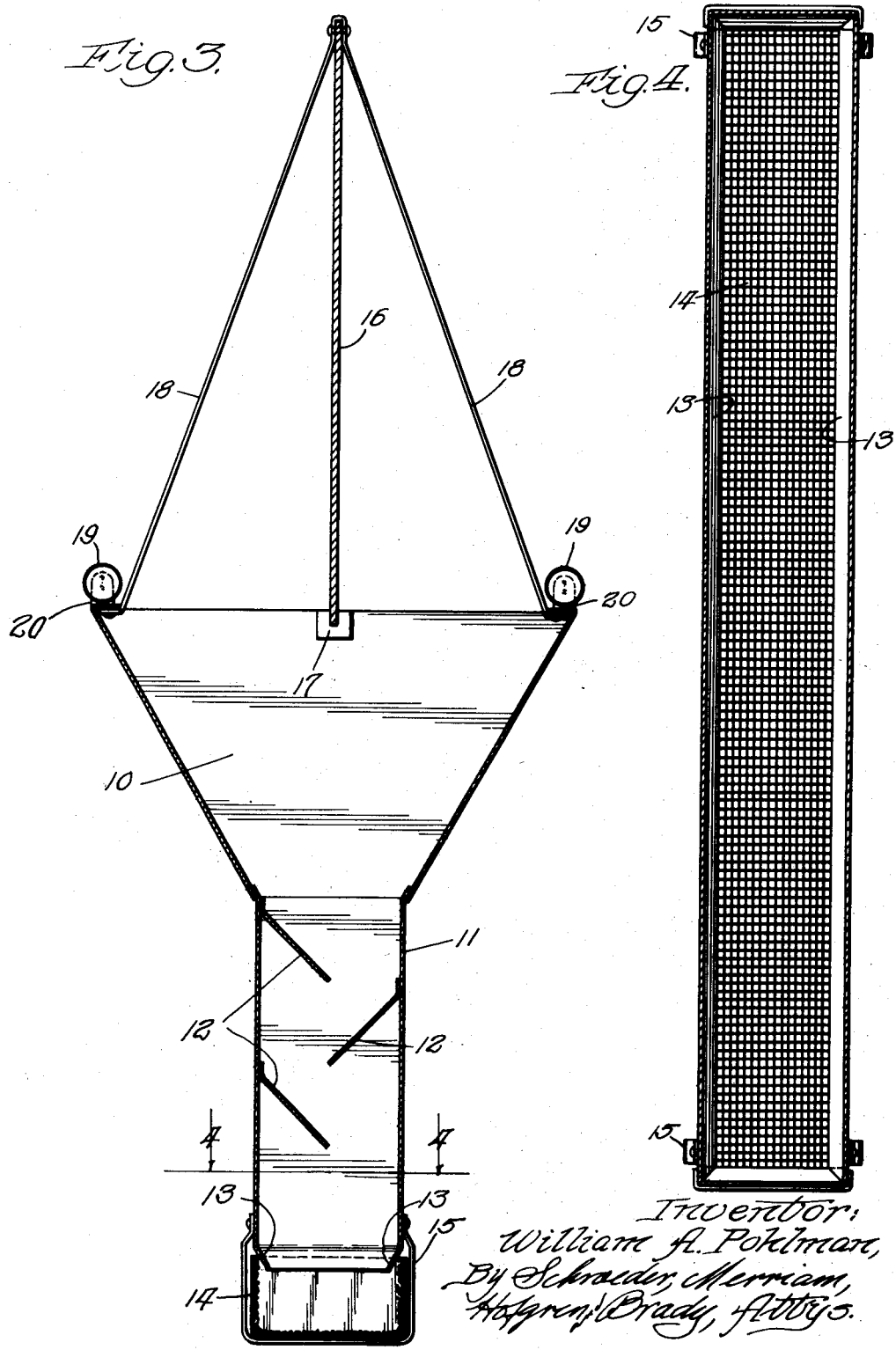

Patented July 21, 1953

2,645,877

UNITED STATES PATENT OFFICE 2,645,877

INSECT TRAP

William A. Pohlman, Horicon, Wis.

Application December 1, 1951, Serial No. 259,322

3 Claims. (Cl. 43—113)

This invention relates to an insect trap and more particularly to a light source type of trap for trapping and catching photoactive insects.

Great damage is done each year to the leaves of plants by larvae from eggs deposited by photoactive insects. This is particularly true in the case of tobacco plants. For example, a single worm from the egg of a night flying photoactive moth belonging to the order Lepidoptera, suborder Heterocera can destroy an entire tobacco plant within a relatively short period of time. The present types of light source traps designed to attract and catch these photoactive moths before they can lay their eggs have a number of disadvantages and are on the whole unsatisfactory. Although attracted to the traps, the moths tend to lazy up to them, roost over areas immediately adjacent to the traps, and deposit their eggs in this area. As a result, the immediate area surrounding such traps is highly infested. Generally these traps fail to attract and catch enough moths to prevent general infestation of the area. As a result, the fields have to be sprayed with poison at periodic intervals and workers hired to continually pick the larvae from the leaves.

I have invented and am here disclosing an insect trap which overcomes the above mentioned objections and disadvantages as well as others which will appear more fully hereinafter.

A primary object of this invention is to attract and catch photoactive moths as well as other photoactive insects.

Another object of this invention is to provide an insect trap having a spectral energy source in combination with certain fluorescent pigments.

Another object of this invention is to attract photoactive moths and other photoactive insects to the trap in such a manner that they are in effect blinded to the existence of a generally upright plate and impinge against this plate.

Still another object of this invention is to selectively attract and catch photoactive moths.

Other objects and advantages will be apparent from the following description and drawings illustrating a preferred embodiment of this invention in which:

Fig. 1 is a front elevation view of the insect trap;

Fig. 2 is a top plan view of the insect trap;

Fig. 3 is a vertical section view along line 3—3 of Fig. 1; and

Fig. 4 is a section view along the line 4—4 of Fig. 3.

Referring to the drawings, a receptacle, here shown as an open mouthed trough of sheet metal, includes an upper hopper-shaped unit 10, having an open, rectangular shaped bottom. A throat element 11, composed of enclosing side and end walls extends downwardly from the bottom of the hopper and has a plurality of longitudinally staggered baffles 12 secured to the inner surface of the side walls. These baffles project from the side walls at a downward slope to prevent the escape of insects falling through the hopper 10 and the throat 11. It is to be understood that the actual number of baffles is unimportant so long as there is a sufficient number to retain the insects falling through the throat 11.

The bottom edges 13 of the throat 11 are beveled and a removable screen basket 14 having an open top is mounted under the throat with the edges forming the top of the basket 14 abutting the beveled edges 13 of the throat 11. Two straps 15, each located near an end of the bottom of the throat 11 hold the basket in position. The ends of each strap are secured to opposing side walls of the throat 11 in such a manner that the looped portion of the strap bearing on the bottom of the basket holding the top edges of the basket against the beveled edges of the throat can be pivoted over the end corners of the basket so that the basket can be removed from beneath the trap, emptied of insects, and then reinstalled under the throat 11. Although a removable screen basket 14 is here shown, any other type of container may be employed for holding the trapped insects.

A plate 16 made of sheet metal, plywood, or the like, is mounted above the hopper 10 in a vertical position substantially in alignment with the longitudinal center line of the hopper and extends the length of this hopper. Each bottom corner of this plate is mounted in a slit on the top of a block, as 17, secured to an end wall of the hopper 10. Metal straps 18, each having one end bolted to a top corner of the plate 16 and the other end fastened to the inwardly bent top side edge of the hopper, aid in supporting the plate in a vertical position. This plate is coated with a thin layer of fluorescent paint, preferably the Signal Green Paint of U. S. Patent No. 2,498,592, manufactured by Switzer Bros., Inc., consisting of blue toner colored solid pigment particles of 4-amino 1,8 naphthol p-xenylimide dye solvated in polymerized butyl alcohol-modified urea-formaldehyde resin carrier in the ratio of approximately .01 gram of dye per cubic centimeter of carrier and a transparent resinous vehicle which binds the carrier particles.

Two fluorescent lights 19 extend lengthwise atop the hopper 10, each aligned with a top inwardly bent sidewall edge of the hopper 10. These lights are supported at their ends by brackets 20 mounted on the bent top edges of the hopper 10 and serve as the light source for emitting light rays directed at the fluorescent coating on the plate and causing it to fluoresce. Wires not shown in the drawings, lead from the brackets to an electrical source of power not shown in the drawings for supplying electrical current to the lights. Although a white light source may be employed, it is preferred that a source emitting electromagnetic energy of from about 3500 to 4200 wave length angstroms and having a peak emission at approximately 3650 wave length angstroms be used to selectively attract photoactive moths. This is important when the trap is used in tobacco fields as only a very small number of photoactive beetles which are beneficial to the crop are thus attracted to the trap.

It is to be noted that the combination of the light source 19 and the fluorescent coating is such that when the rays of light are directed at the coating, electromagnetic radiations are given off by the coating and the light source which serves to attract, for example, photoactive moths. However, the radiation is such that the moths are attracted to the plate in such a manner that they are completely unaware of the presence of the vertical plate 16, and to this extent they are in effect blinded. Consequently, they impinge against this plate rather than lazy up to it; are stunned; and fall into the trap where the baffles 12 prevent their escape.

A large number of experiments have been carried on with traps embodying this invention in tobacco fields. The results of the tests indicate the excellent effectiveness of the traps in preventing photoactive moth worm infestation of tobacco fields. For example, three plots of tobacco, all in a direct line of one trap, were 100 per cent free of photoactive moth worm infestation when the trap was maintained in operation for a period of several months. One plot of two and a half acres was located directly under the trap; the second plot of one and three-quarters acres was located across a creek and shielded by trees; and the third plot of three acres was approximately one thousand feet from the trap on the side of a hill practically at the same level as the trap with no intervening timber. Tobacco fields outside the influence of the radiation of the trap were very badly infested with photoactive moth worms.

Another trap, mounted on a slight rise, was positioned so that the radiations emitted were beamed toward two plots, one approximately three and a half acres and located immediately in front of the trap and the other approximately 1000 yards away from the trap and located on a hill 300 feet above the trap, two-thirds of this plot being masked from the trap by a heavy growth of trees. The two plots were 100 per cent free of photoactive moth worm damage after the trap had been in operation several months; whereas, the moth worm damage to plots about eight miles from the trap was approximately 50 per cent, despite spraying these plots with poison and employing worm pickers.

Four traps were placed at spaced intervals along the perimeter of an area of approximately one and a half squares miles. The tobacco plots in direct line of the traps showed little or no damage, but a plot located off to the side of the traps and three-quarters of a mile from any one of them had approximately 6 per cent photoactive moth worm damage. A plot four miles from the trap and not in a direct line therewith had approximately 50 per cent photoactive moth worm damage even after four poison sprayings.

A tobacco plot of three acres, located at the intersection of light beams from two traps located one-half mile from the plot, was 100 per cent free of any photoactive moth worm damage; whereas, areas outside of the direct line of the trap were heavily infested.

The foregoing detailed description is given for clearness of understanding only and no unnecessary limitations are to be understood therefrom as modifications will be obvious to those skilled in the art.

I claim:

1. An insect trap comprising: a plate mounted in a generally upright position; means for supporting said plate; a signal green fluorescent coating on at least a portion of the surface of said plate, said coating comprising blue toner colored solid pigment particles of 4-amino 1,8 naphthol p-xenylimide dye solvated in polymerized butyl alcohol—modified urea—formaldehyde resin carrier in the ratio of approximately .01 gram of dye per cubic centimeter of carrier and a transparent resinous vehicle binding the carrier particles; a light source so arranged and constructed that light rays from the source strike the coating; and a receptacle supporting said plate and located immediately therebelow for receiving and retaining insects striking the plate.

2. An insect trap comprising: a plate mounted in a generally upright position; means for supporting said plate; a signal green fluorescent coating on at least a portion of the surface of said plate, said coating comprising blue toner colored solid pigment particles of 4-amino 1,8 napththol p-xenylimide dye solvated in polymerized butyl alcohol—modified urea—formaldehyde resin carrier in the ratio of approximately .01 gram of dye per cubic centimeter of carrier and a transparent resinous vehicle binding the carrier particles; a light source so arranged and constructed that light rays from the source strike the coated surface of the plate, said source emitting electromagnetic energy of from approximately 3500 to 4200 wave length angstroms, the peak of the emission being approximately 3650 wave length angstroms; and a receptacle supporting said plate and located immediately therebelow for receiving and retaining insects striking the plate.

3. An insect trap comprising: an open-mouth trough having a bottom and means for retaining photoactive moths falling into said trough; a plate mounted immediately above the mouth of the trough extending outwardly therefrom, said plate being so positioned that insects impinging against the plate fall into said trough; a signal green fluorescent coating on at least a portion of the surface of the plate, said coating comprising blue toner colored solid pigment particles of 4- amino 1,8 naphthol p-xenylimide dye solvated in polymerized butyl alcohol—modified urea—formaldehyde resin carrier in the ratio of approximately .01 gram of dye per cubic centimeter of carrier and a transparent resinous vehicle binding the carrier particles; and a light source so arranged and constructed that light rays from the source strike the coating, said source emitting electromagnetic energy of from about 3500 to 4200 wave length angstroms, the peak of the emission being approximately 3650 wave length angstroms so as to selectively attract photoactive moths.

WILLIAM A. POHLMAN.

References Cited in the file of this patent

UNITED STATES PATENTS

| Number | Name | Date |
|---|---|---|
| 1,037,688 | Troth | Sept. 3, 1912 |
| 2,498,592 | Switzer et al. | Feb. 21, 1950 |

FOREIGN PATENTS

| Number | Country | Date |
|---|---|---|
| 22,741 | Great Britain | 1912 |
| 255,022 | Switzerland | Jan. 3, 1949 |

OTHER REFERENCES

Electronic Engineering, December 1946.